United States Patent Office 2,835,864
Patented May 20, 1958

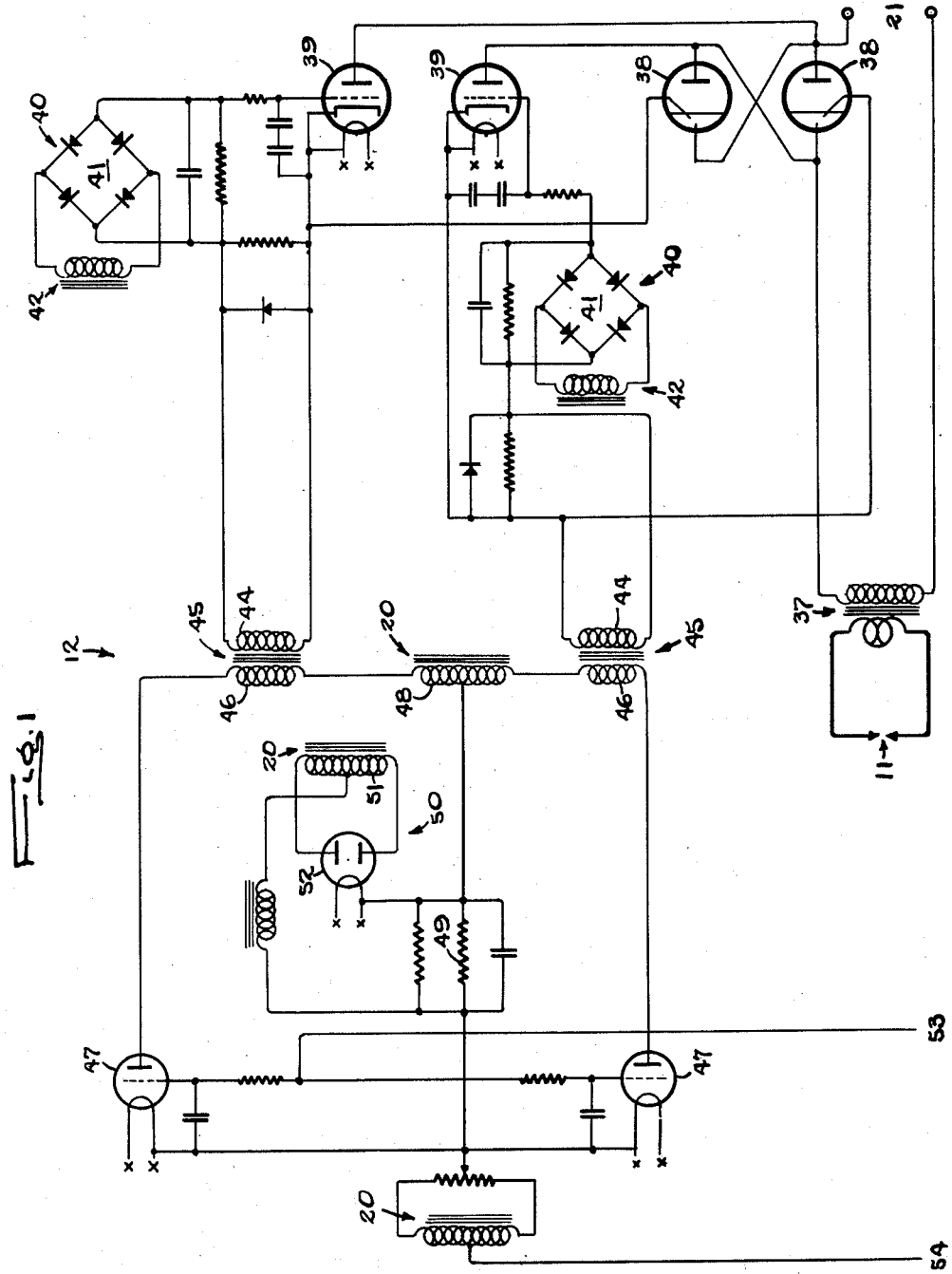

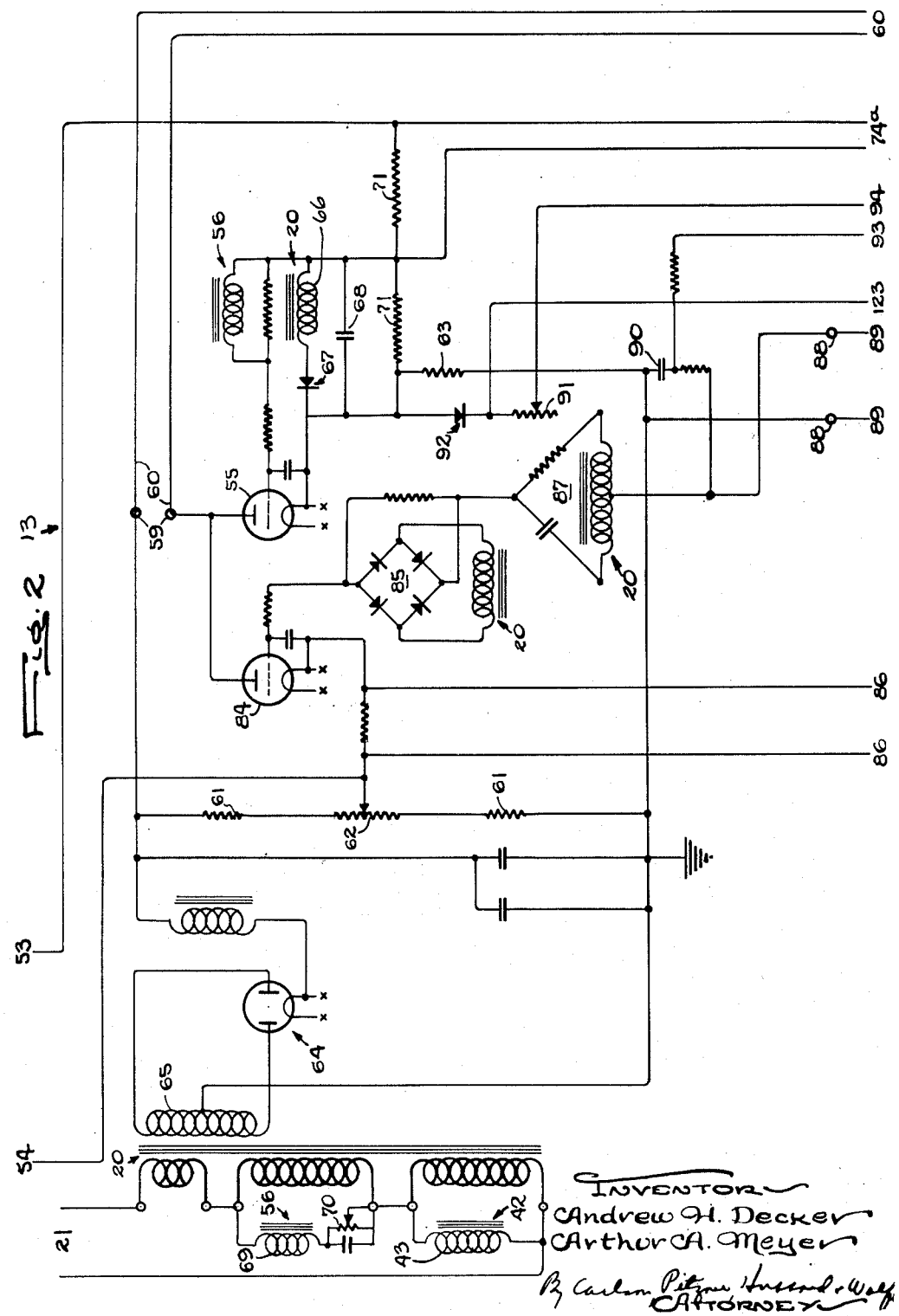

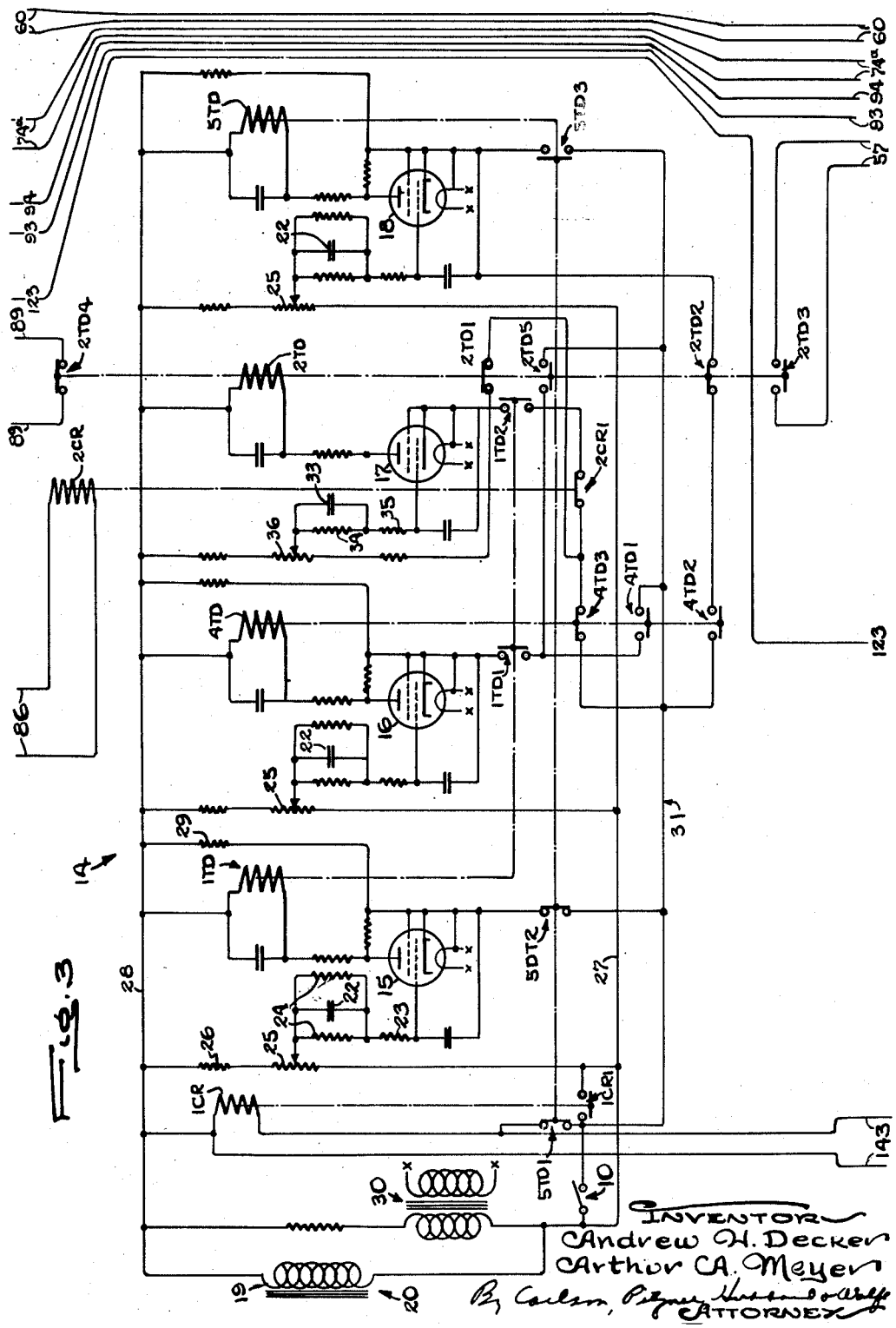

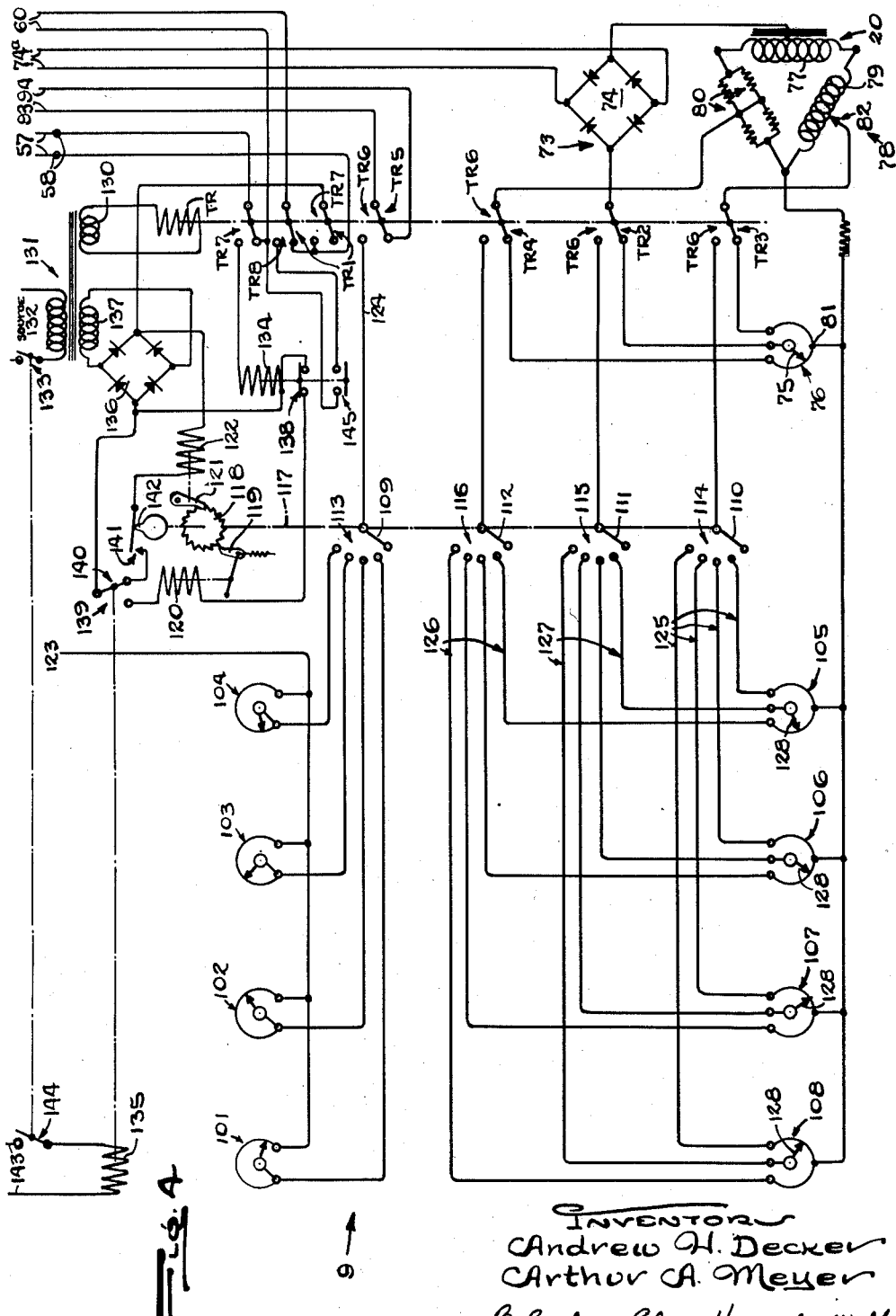

2,835,864

WELDING CONTROL APPARATUS

Andrew H. Decker and Arthur A. Meyer, Beloit, Wis., assignors to Warner Electric Brake & Clutch Company, South Beloit, Ill., a corporation of Illinois Application September 14, 1953, Serial No. 379,925

13 Claims. (Cl. 323—36)

This invention relates generally to welding controls and, more particularly, to a control for resistance welding apparatus of the type having a welding cycle which comprises a "squeeze" interval, a "weld" interval, and a "hold" interval and in which welding current flows during the weld interval in a series of "heat" or current "on" periods separated by "cool" or current "off" periods. The character of a weld produced by this type of apparatus is determined by the amount of electrical energy delivered to the work during the weld interval, such energy depending on both the amount of welding current flowing during each heat period and the length of the latter. In welding apparatus of this type, the amount of welding current delivered to the work in each heat period is usually determined by the value of a variable impedance in a phase shift network and the length of the heat periods depends on the value of a variable impedance in a timing circuit.

One object of the invention is to improve welding apparatus of the above character through the addition of novel means by which each welding operation may be controlled more closely than has been possible with similar apparatus used heretofore, which comprises only a few parts of low total cost as compared to the entire apparatus, and which may be incorporated easily into prior art welding apparatus now in use.

Another object is to provide welding apparatus of the above character in which the value of impedance effective in the energy controlling circuits may be varied selectively for each heat period to enable different controlled amounts of energy to be delivered to the load circuit during successive heat periods.

Still another object is to provide a plurality of selectively variable impedance elements and utilize current variations inherent in the welding cycle to connect the impedance elements successively into the energy controlling circuits in timed relation to the heat periods.

A further object is to provide a plurality of selectively variable impedance elements for the heat period timing circuit and separate impedance elements for the phase shift network to enable both the amount of welding current flowing during each heat period and the length of the latter to be controlled individually.

A more detailed object is to connect the impedance elements into the heat period timing circuit and the phase shift network successively by a step by step advancing switching mechanism which is advanced one step during each cool period as an incident to termination of the preceding heat period to render different values of impedance effective throughout the succeeding heat period.

Other objects and advantages of the invention will become apparent from the following detailed description taken in connection with the accompanying drawings, in which Figures 1, 2, 3 and 4 arranged in succession one above the other with Fig. 1 at the top and Fig. 4 at the bottom constitute a complete schematic wiring diagram of welding control apparatus embodying the novel features of the present invention.

While the invention is susceptible of various modifications and alternative constructions and uses, I have shown in the drawings and will herein describe in detail one embodiment of the invention incorporated in a control for resistance welding apparatus. It is to be understood that I do not intend to limit the invention by such disclosure, but aim to cover all modifications and alternative constructions and uses falling within the spirit and scope of the invention as expressed in the appended claims.

Generally, the welding apparatus shown in the drawings is of the type adapted to perform a resistance welding operation in an automatic cycle comprising a squeeze interval, a weld interval, and a hold interval. The cycle is started in response to closure of a foot switch 10, the squeeze interval allowing time for welding electrodes 11 to be clamped by hydraulic pressure against opposite sides of workpieces (not shown) to be welded together. During the weld interval which begins at the end of the squeeze interval, welding current flows through the electrodes in a series of stages each comprising a current "on" or heating period followed by a current "off" or cooling period. All welding current flow ceases at the beginning of the hold interval which allows time for the weld to set and at the end of which the hydraulic clamping pressure on the electrodes is released. For purposes of description, the apparatus has been divided into four parts including a power section 12 (Fig. 1) which delivers current to the welding electrodes 11, a synchronous control network 13 (Fig. 2) which controls the delivery of welding current by the power section 12, and a sequence timer 14 (Fig. 3) which controls the lengths of the intervals of the welding cycle and which cooperates with the synchronous network to control the lengths of the current "on" and current "off" periods. The fourth part, a heat control network 9 (see Fig. 4), cooperates with the synchronous network 13 and the sequence timer 14 to control the amount and duration of welding current flow in current "on" periods.

Referring first to the sequence timer 14 (Fig. 3) the latter comprises four time delay circuits one controlling each of the squeeze, weld, and hold intervals and a fourth controlling the current "on" and current "off" periods. Each of these time delay circuits includes a resistance-capacitance combination of timing elements and a cooperating control or trigger tube which, as is well known, may be the type generally known as a thyratron. The squeeze interval is initiated by closure of the foot switch 10 and is terminated in response to firing of a squeeze tube 15. Such firing also starts the weld interval which is terminated by the delayed firing of a weld tube 16. During the weld interval, a pulsation tube 17 fires and is extinguished alternately to determine the beginning and the end of each of a series of current "on" periods. The hold interval begins at the end of the weld interval and is terminated by firing of a hold tube 18.

To initiate the squeeze interval and therefore the welding cycle, the foot switch 10 is included in the energizing circuit of a relay 1CR having normally open contacts 1CR-1 in the load or plate to cathode circuit of the squeeze tube 15 so that this load circuit is completed by pull in of the relay in response to closure of the foot switch. The relay energizing circuit includes the secondary 19 of a step down transformer 20 whose primary is energized from a higher voltage source 21. Current for heating the cathodes of the various tubes in the control may be supplied in any suitable manner as by a transformer 30 whose primary is connected across the transformer secondary 19 and whose secondary terminals x—x are connected by suitable conductors to terminals x—x of the respective cathodes. To maintain the relay 1CR energized after release of the foot switch, the contacts 1CR-1 are included in a holding circuit for the relay by-passing the foot switch. The contacts 1CR-1 may also control suitable apparatus (not shown) for applying hydraulic pressure to the welding electrodes 11 when the relay 1CR is energized.

Firing of the squeeze tube 15 after closure of its load circuit by pull-in of the relay 1CR is delayed for a predetermined time which is known as the squeeze interval. Such time delay is effected by resistance-capacitance timing elements including a capacitor 22 connected in series with a resistor 23 and in parallel with resistors 24 between the control grid of the tube and an adjustable timing potentiometer 25. The latter is connected in series with two resistors 26 between two conductors 27 and 28 forming a voltage divider network joined to opposite ends of the transformer secondary 19. One conductor 28 extends between the plate of the squeeze tube and the transformer secondary and the other conductor 27 connects the divider to the squeeze tube cathode through the contacts 1CR-1. When the latter are open the capacitor 22 is charged with the control grid side thereof negative by grid rectification. The electrons flow from the conductor 28 through a resistor 29 to the tube cathode, from the cathode to the grid within the tube and through the resistor 23 into the negative plate of the capacitor. Likewise, electrons flow from the positive plate of the capacitor to potentiometer 25 and resistor 26 to the conductor 27 and the other end of the transformer secondary, thus storing a charge in the capacitor.

When the contacts 1CR-1 are closed to connect the conductor 27 to the cathode of the squeeze tube 15 completing the load circuit of the latter, the tube is prevented from firing by the negative bias impressed on the control grid by the capacitor 22. The capacitor discharges through the resistors 24, however, until the negative grid bias becomes low enough for the tube to fire. The length of the time delay is determined by the values of the capacitor 22 and its parallel resistors 24 and the voltage to which the capacitor becomes charged. This capacitor voltage depends on the setting of the voltage divider potentiometer 25.

Conduction by the squeeze tube 15 results in energization of a relay 1TD which is connected in the squeeze tube load circuit and which has normally open contacts 1TD-1 connected in the load circuit of the weld tube 16 along with the coil of a relay 4TD. Completing the weld tube load circuit between the conductor 28 and a conductor 31 connected to the other end of the transformer secondary 19 are normally open contacts 4TD-1 of the relay 4TD and parallel normally open contacts 2TD-5 of a pulsation relay 2TD.

The time delay elements of the weld tube 16 are similar to and have the same reference numbers as those of the squeeze tube 15 and include a capacitor 22 which is charged to a voltage determined by the setting of a voltage divider potentiometer 25 when the load circuit of the weld tube is open. The capacitor 22 discharges after closure of contacts 1TD-1 and during intermittent closure of contacts 2TD-5 in a manner to be described later. At the end of a time delay following firing of the squeeze tube and pull in of the relay 1TD, the weld timing tube conducts to energize the relay 4TD for termination of the weld interval and beginning of the hold interval.

To begin the hold interval, normally open contacts 4TD-2 of the relay 4TD are located in the load circuit of the hold tube 18 so as to complete this circuit when the weld tube 16 fires. Time delay elements similar to those of the squeeze and weld tubes 15 and 16 and having the same reference numbers delay firing of the hold tube for the desired length of the hold interval after the load circuit of the tube is completed. A relay 5TD in the hold tube load circuit is pulled-in upon firing of the tube to open normally closed contacts 5TD-1 in series with the relay 1CR and 5TD-2 in the load circuit of the squeeze tube 15. Pull in of the relay 5TD also closes contacts 5TD-3 to complete a holding circuit for the hold tube by-passing the contacts 4TD-2.

Firing of the hold tube thus results in dropping out of the relay 1CR to extinguish the squeeze tube 15 and deenergize the relay 1TD due to opening of contacts 5TD-2. When the relay 1TD drops out and contacts 1TD-1 open, the weld tube 16 is extinguished and its relay 4TD drops out. Drop out of relay 4TD opens holding contacts 4TD-1 in the load circuit of the weld tube and contacts 4TD-2 in the load circuit of the hold tube.

The flow of welding current to the electrodes 11 during the weld interval is controlled by the relay 2TD whose energizations determine the current "on" periods and whose deenergization causes welding current flow to cease in a manner to be described later. Energization of the relay 2TD is controlled by the pulsation tube 17 whose load circuit extends between the conductor 28 and 31 and includes the coil of the relay 2TD, normally open contacts 1TD-2 of the relay 1TD, and normally closed contacts 4TD-3 of the hold relay 4TD in its load circuit. Thus, pull-in of the relay 1TD at the end of the squeeze interval completes the pulsation tube load circuit as well as that of the weld tube 16 and pull-in of the relay 4TD at the end of the weld interval results in opening of the pulsation tube load circuit at the same time that the hold tube load circuit is closed.

During the weld interval, the load circuit of the pulsation tube 17 is interrupted intermittently by opening of normally closed contacts 2CR-1 which are connected in the load circuit and are opened momentarily upon energization of a relay 2CR to terminate each current "on" period in a manner to be described later. Firing of the pulsation tube for another current "on" period after such interruption of its load circuit is delayed for a time interval defining the current "off" period. This delay is effected by timing elements including a capacitor 33 connected in parallel with a resistor 34 and in series with a resistor 35 between the control grid of the tube and a voltage divider potentiometer 36. The latter is connected across the transformer secondary 19 through the conductors 28 and 31, normally closed contacts 2TD-1 of the relay 2TD, and the normally closed contacts 4TD-3 of the pulsation tube load circuit. When this load circuit is closed and the contacts 2TD-1 are open, the capacitor is charged to a voltage determined by the setting of the potentiometer 36 by a grid rectified current with the grid side of the capacitor negative. Then, when the load circuit of the tube is opened momentarily by pull-in of the relay 2CR, the tube is extinguished and the contacts 2TD-1 are closed to connect the capacitor between the cathode and the grid. The tube remains extinguished until the capacitor 33 discharges through its parallel resistor 34 making the bias potential of the grid gradually less negative until the firing point is reached.

To insure that the beginning of the hold interval occurs during a current "off" period, normally closed contacts 2TD-2 of the relay 2TD are located in series with the normally open contacts 4TD-2 in the hold tube load circuit. Thus, even though the relay 4TD may pull-in to close the contacts 4TD-2, the hold tube load circuit will not be completed until the relay 2TD drops out at the end of a current "on" period.

Referring now to the power section 12, welding current is supplied to the electrodes 11 through a transformer 37 whose primary is connected across the line voltage source 21 of alternating current which is connected in series with a pair of ignitrons 38 connected in the conventional back-to-back or inverse parallel relation. Firing of the ignitrons for the flow of current to the welding electrodes is controlled by firing thyratrons 39 whose plate to cathode circuits are connected between the anodes and igniter electrodes of the respective ignitrons. The control grids of the firing thyratrons are normally biased to cut-off by two separate sources 40 of negative bias voltage each including a rectifier 41 and a transformer 42 whose primary 43 is energized from the line voltage source through the step-down transformer 20.

To control the times when the firing thyratrons 39 conduct, the bias circuits of the latter also include secondaries 44 of transformers 45 whose primaries 46 are connected in the respective load or anode to cathode circuits of two timing thyratrons 47. These load circuits also include opposite halves of a secondary 48 of the step-down transformer 20 and have a common series resistor 49 which is part of a direct current bias source 50 including a rectifier 52 and a secondary 51 of the step down transformer 20. Normally, the timing thyratrons 47 are rendered non-conductive by a negative bias applied between the control grids and cathodes of the tubes through conductor 53 and 54, the tubes being rendered conductive when positive impulses are applied to their control grids along the conductor 53 by the synchronous network 13 in a manner to be described later.

The signals applied to the respective bias circuits of the firing thyratrons 39 in response to conduction by the timing thyratrons 47 are oppositely phased so that the firing thyratrons conduct alternately to fire the ignitrons 38 in successive half cycles of the welding current source 21. Such opposite phasing is due to the connection of the anodes of the timing tubes to opposite ends of the transformer secondary 48 whose midpoint is connected to the tube cathodes so that the anode of each tube is positive relative to its cathode while the anode of the other tube is negative relative to its cathode.

The amount of current conducted by each ignitron 38 depends on the time when its associated firing tube 39 begins conducting in relation to the half cycle of the source 21 during which the anodes of the ignitron and its firing tube are positive relative to their respective cathodes. This time of conduction by each firing tube is determined in turn by conduction of the timing thyratrons 47 in response to the positive impulse applied to the control grids of the latter along the conductor 53. If such an impulse is delivered to the grid of each timing thyratron during the first part of each half cycle when its anode is positive relative to its cathode, each ignitron will be fired sooner during its conducting half cycle of the source 21 than when the impulse is retarded or shifted in phase to occur later in the half cycle when the anode of the timing thyratron is positive.

Positive impulses are delivered to the grids of the timing thyratrons 47 through the conductor 53 for the flow of welding current in response to conduction of a starting thyratron tube 55 in the synchronous network 13. Such conduction determines the current "on" periods and occurs when a pair of normally open contacts 2TD-3 of the relay 2TD of the sequence timer 14 are closed to complete the load or anode to cathode circuit of the start tube and when a positive impulse of voltage is applied to the control grid of the tube by a peaking or impulse transformer 56. Herein, the contacts 2TD-3 are connected by conductors 57 to terminals 58 which are connected to two terminals 59 in the start tube load circuit by conductors 60 through normally closed contacts TR-1 of a transfer relay TR to be described later.

In addition to the contacts 2TD-3, the anode to cathode circuit of the start tube 55 includes two fixed resistors 61 and a voltage divider potentiometer 62 which are connected in series with a fixed resistor 63 and in parallel with a direct current voltage source 64 comprising a full-wave rectifier and a secondary 65 of the step down transformer 20. Negative voltage normally biasing the start tube 55 to cut-off is derived from a secondary 66 of the step-down transformer 20 and a rectifier 67 which are connected between the control grid and cathode of the tube in parallel with a smoothing capacitor 68 and in series with the secondary of the impulse transformer 56. The latter has a primary 69 energized through the step-down transformer 20 and delivers a positive impulse of voltage to the grid of the start tube during each cycle of the source 21 at a time determined by the value of a variable resistor 70 in series with the transformer primary 69.

To apply negative bias to the control grids of the timing thyratrons 47, the conductor 54 connects the cathodes of the latter to the variable element of the voltage divider potentiometer 62 in the start tube load circuit and the conductor 53 connects the grids through two resistors 71 to the start tube cathode. The latter, in turn is connected to the one of resistors 61 through the fixed resistor 63 to complete the timing thyratron bias circuit. Since this bias circuit includes the fixed resistor 63 and one of the resistors 61 in the start tube load circuit, conduction by the start tube 55 results in the application of a positive voltage to the timing thyratron grids along the conductor 53. To convert this voltage to a series of positive impulses with one impulse occurring during each half cycle of the source 21 and to control the point during the half cycle when the impulse occurs, a phase shift and peaking network 73 is connected to the conductor 53 between the start tube cathode and the timing thyratron grids.

The phase shift and peaking network 73 which is a part of the heat control network 9 includes a full wave rectifier 74 whose output terminals are connected by conductors 74ª to opposite ends of one of the resistors 71 between the start tube cathode and the timing thyratron grid conductor 53. The input terminals of the rectifier 74 are connected respectively to the slider or movable element 75 of a heat control voltage divider 76 through normally closed contacts TR-2 of the relay TR and to the midpoint of a secondary 77 of the step-down transformer 20. This transformer secondary forms one leg of a delta circuit 78 having a variable reactor 79 in a second leg and fixed parallel resistors 80 in the third leg. The center point 81 of the heat control divider 76 is connected through a fixed resistor to the corner of the delta bridge 78 between the reactor 79 and resistors 80. Opposite ends of the divider are connected respectively through normally closed contacts TR-3 and TR-4 of the relay TR to a variable tap 82 on the reactor 79 and center taps on the parallel resistors 80 in the third leg of the delta.

With this phase shift and peaking network 73 interposed between the start tube cathode and the control grids of the timing thyratrons 47, the point during each half cycle of the source 21 when a positive impulse is applied along the conductor 53 to the grids of the timing thyratrons is determined by the setting of the heat control slider 75 of the divider 76. When the slider is positioned between the midpoint 81 of the divider and the end of the latter connected to the delta resistors 80, the impulse occurs late in each half cycle of the source so that the timing thyratrons, the firing thyratrons 39, and the ignitrons 38 all fire late in the half cycle of the source and the resultant welding current is low. When the slider is advanced toward the other end of the divider, the impulse and the times of firing of the ignitrons 38 are advanced so that the welding current is increased.

The start tube 55 is rendered conductive for the flow of impulses to the phase shift and peaking network 74 when the contacts 2TD-3 are closed. Opening of these contacts to extinguish the start tube and thereby terminate a current "on" period is effected in response to firing of a stop thyratron tube 84 a predetermined time after firing of the pulsation tube 17 and closure of the contacts. For this purpose, the plate circuit of the stop tube includes the coil of the relay 2CR which, as described above has normally closed contacts 2CR-1 connected in the plate to cathode circuit of the pulsation tube 17. Thus, conduction by the stop tube results in energization of the relay 2CR so that the contacts 2CR-1 and therefore the plate circuit of the pulsation tube are opened. This results in deenergization of the relay 2TD and opening of the contacts 2TD-3 to extinguish the start tube 55. Conductors 86 connect the relay 2CR into the stop tube load circuit. The contacts 2TD-3 are also located in the load circuit of the stop tube and the latter is extinguished by opening of these contacts the same as the start tube. To complete the plate or load circuit of the stop tube 84, the relay 2CR and the contacts 2TD-3 are connected in series with one of the resistors 61 and a part of the voltage divider potentiometer 62 in the load circuit of the start tube 55. Negative bias normally maintaining the stop tube 84 extinguished is supplied by a bias circuit including a rectifier 85, a secondary of the step-down transformer 20, and a phase shifter 87 connected between the cathode and control grid of the tube in series with normally closed contacts 2TD-4 of the relay 2TD. The latter contacts are connected to terminals 88 in the stop tube bias circuit by conductors 89.

Negative bias is removed from the control grid of the stop tube 84 in response to charging of a timing capacitor 90 a predetermined time interval after the relay 2TD is energized and the start tube 55 begins to conduct. For this purpose, the timing capacitor 90 is connected in parallel with the normally closed contacts 2TD-4 of the stop tube bias circuit and in series with a variable timing resistor 91 and a rectifier 92 across the fixed resistor 63 in the start tube load circuit. For a purpose to appear later, normally closed contacts TR-5 of the transfer relay TR are connected in series with the timing resistor 91 by conductors 93 and 94.

When the relay 2TD is energized, the start tube 55 begins conducting and the normally closed contacts 2TD-4 are opened to connect into the stop tube bias circuit the timing capacitor 90 which had previously discharged through the normally closed relay contacts 2TD-4. Then, as the start tube conducts, the timing capacitor begins to charge and the control grid of the stop tube 84 becomes more positive relative to the cathode. After a time interval determined by the setting of the timing resistor 91, this positive charge is sufficient to render the stop tube conductive for energization of the relay 2CR to open the contacts 2CR-1 in the pulsation tube load circuit and deenergize the relay 2TD to extinguish both the start tube and the stop tube.

The apparatus thus far described with the exception of the transfer relay TR is manufactured and sold by the Westinghouse Electric Corporation of Pittsburgh, Pennsylvania, and includes the Westinghouse Synchronous Welder Control No. SP14H and Westinghouse Sequence Timer No. NEMA9B. In the operation of this apparatus, closure of the foot switch 10 completes the energizing circuit of the relay 1CR and the contacts 1CR-1 thereof are closed to complete the holding circuit for the relay and the plate circuit of the squeeze tube 15. The latter fires to terminate the squeeze interval and pull in the relay 1TD to complete the load circuits of the weld tube 16 and the pulsation tube 17 a predetermined time after closure of the foot switch. The pulsation tube fires immediately to pull in relay 2TD to close the load circuit of the start tube 55 and connect the timing capacitor 90 into the bias circuit of the stop tube 84 by opening of contacts 2TD-4. Current impulses of the proper phase and timing then are transmitted by conduction of the start tube to the grids of the timing thyratrons 49 for the flow of welding current to the electrodes 11. Such current flow during this current "on" period continues until the stop tube 84 fires to pull in the relay 2CR and open the load circuit of the pulsation tube 17 for deenergization of the relay 2TD and opening of the contacts 2TD-3 in the start tube load circuit. The contacts 2TD-4 are also closed for discharge of the timing capacitor 90. After a short current "off" period whose length is determined by the discharge of the capacitor 33 in the grid circuit of the pulsation tube 17, the latter fires again for another current "on" period.

The pulsation tube 17 continues to fire intermittently until the weld tube 16 fires to energize the relay 4TD and terminate the weld interval by opening the load circuit of the pulsation tube. In this instance, the welding cycle may comprise four current "on" periods. As soon as the relay 4TD pulls-in and the pulsation tube 17 is extinguished, the load circuit of the hold tube 18 is completed to start the hold interval. At the end of this interval, the hold tube fires and the relay 5TD is energized to open the energizing circuits through the relays 1CR and 1TD. Thus, the load circuits of all of the tubes of the sequence timer 14 from the transformer secondary 19 through the contacts 1CR-1, and the conductors 28 and 31 are all returned to their starting conditions for the beginning of another welding cycle.

The amount of electrical energy delivered to the electrodes 11 during each current "on" period depends not only on the length of the period which is determined by the setting of the timing resistor 91 in the synchronous network 13 but also, on the point during each half cycle of the source 21 when an impulse is transmitted from the phase shifter and peaking network 73 and along the conductor 53 to the grids of the timing thyratrons 47. This point is determined by the setting of the slider 75 of the heat control divider 76. In the apparatus thus far described, both the length of each current "on" period and the amount of welding current flowing therein remain constant throughout the weld interval because the values of impedances in the energy controlling circuits, that is, the timing reistor 91 and the heat control divider 76 remain fixed throughout each welding cycle.

Such delivery of the same amount of electrical energy to the welding electrodes 11 during each current "on" period is not an ideal condition because the contact area between the workpieces and the resistance of the work caused by heating thereof increases as the welding cycle progresses. Thus, the contact between the workpieces at the beginning of the weld interval is limited to points of small area resulting in high current densities at these points which melt the points and cause spattering or throwing out of the molten particles of metal. If the amount of current flow in each current "on" period is small enough or if each period is made short enough to avoid spattering of the metal at the beginning of the weld interval, the amount of current or the lengths of the periods in the latter part of the interval are insufficient to produce a proper weld.

To overcome the foregoing difficulties and improve the control of a welding operation performed with apparatus of the above character, the present invention contemplates the provision of novel means by which at least one and preferably both of the energy controlling impedances, herein the timing resistor 91 and the divider 76, may be varied selectively and in successive steps as the weld interval progresses for the delivery of different controlled amounts of energy to the electrodes 11 during each current "on" period. This means includes a switch mechanism 100 which is actuated in timed relation to welding current impulses inherent in the welding cycle and which is operable to render different values of the energy controlling impedances 91 and 76 effective successively as the weld interval progresses. In the present instance, four different values of the timing resistor 91 or period length controlling impedance are provided by four separate selectively variable rheostats 101, 102, 103, and 104 which are connected by the switch mechanism 100 successively into and out of series relation with the timing capacitor 90. Current flow during each current "on" period is controlled herein by varying the values of four potentiometers 105, 106, 107, and 108 which are connected successively into and out of the phase shift network 73 in place of the heat control divider 76.

The switch mechanism 100 in the present instance is a direct-drive tandem stepping switch having four switch arms or wipers 109, 110, 111, and 112 engageable respectively with four banks 113, 114, 115 and 116 of stationary contacts and secured to a shaft 117 which carries a ratchet wheel 118. Rotation of the wheel and the shaft against the action of a release spring (not shown) and in a forward direction or clockwise as viewed in the drawings, is effected by a rotating pawl 119 which is advanced to rotate the ratchet and the shaft one step in response to each energization of a coil 120. The ratchet is held in its advanced position by a holding pawl 121 which normally engages the ratchet teeth but which is retracted in response to energization of a release coil 122 to permit rotation of the ratchet and the shaft in a reverse direction or counterclockwise under the action of the return spring. In the released position of the shaft shown in the drawings, the wipers of the switch do not engage their respective banks of contacts. As the shaft is rotated step by step, however, each arm engages the contact in its associated bank successively.

The first bank 113 of contacts of the stepping switch 100 is utilized to connect the timing rheostats 101, 102, 103 and 104 successively into series relation with the timing capacitor 90. For this purpose, the contacts of the bank are connected in succession to the sliders of the respective rheostats and the resistance elements of the latter are connected together and to the rectifier 92 in series with the timing capacitor 90 by a conductor 123. To complete a circuit in series with the timing capacitor 90 and in parallel with the timing resistor 91, the first wiper 109 is connected by a conductor 124 and through normally open contacts TR-6 of the transfer relay TR to the conductor 93 which is in series with the timing capacitor.

Connection of the phase shift potentiometers 105, 106, 107, and 108 successively into the phase shift network 73 is effected through the contacts of the second, third, and fourth banks 114, 115, and 116 of the stepping switch 100. Conductors 125 join the contacts of the second bank 114 in succession to the potentiometer ends which are to be connected to the variable reactor 79 of the phase shift network. The other ends of the potentiometers are connected individually to the contacts of the fourth bank 116 by conductors 126 while conductors 127 connect the contacts of the third bank 115 to the respective potentiometer sliders 128. When the stepping switch 100 is in its released position, the wipers are out of engagement with the fixed contacts. Then, as the wipers are advanced step by step, the wipers are connected first to the ends and the slider 128 of the first potentiometer 105, then to the ends and slider of the second potentiometer 106 and so on until each potentiometer has been connected into the phase shift network. The midpoints of the potentiometers are all joined together and to the corner of the delta bridge between the reactor 79 and resistors 80 by a conductor 129.

To enable the stepping switch 100 and its associated rheostats and potentiometers to be rendered effective for controlling the welding current or to be disabled selectively for control of the welding current by the original timing resistor 91 and heat control divider 76, the wipers and the energizing circuits of the switch are adapted to be connected to the parts of the sequence timer 14 and the synchronous network 13 through normally open contacts of the transfer relay TR which is provided for this purpose. The coil of this relay is energized by the secondary 130 of a transformer 131 whose primary is adapted to be connected to a source 132 of alternating current through a manually operated switch 133.

When the switch 133 is open so that the coil of the relay TR is deenergized, the original timing resistor 91 and heat control divider 76 of the phase shift network 73 are connected in series with the timing capacitor 90 and to the delta network 78 respectively through the normally closed relay contacts TR-2, TR-3, TR-4, and TR-5 referred to above. Upon closure of the manual switch 133 and energization of the relay, the circuits through the original timing resistor and phase shift potentiometer are opened and the normally open contacts TR-6 are closed to connect the first wiper 109 to the series circuit through the timing capacitor 90, the second wiper 110 to the top 82 of the variable reactor 79, the third wiper 111 to one input terminal of the rectifier 74, and the fourth wiper 112 to the parallel resistors 80 of the delta bridge network. Thus the switching mechanism is conditioned to connect the timing rheostats 101, 102, 103, and 104 and the potentiometers 105, 106, 107 and 108 successively in series with the timing capacitor 90 and into the phase shift network 73 when the rotate coil 120 is energized intermittently.

Energization of the rotate coil 120 and the release coil 122 of the stepping switch 100 in timed relation to current changes inherent in the welding cycle is effected in this instance through the medium of a stepping relay 134 and a disabling relay 135 whose respective energizing circuits are controlled by the relays 2TD and 1CR. Direct current for energizing the stepping relay 134 and the switch coils 120 and 122 is derived from a rectifier 136 of the dry plate type whose input terminals are connected across a secondary 137 of the transfer relay transformer 131. The circuit for connecting the rotate coil 120 to the rectifier 136 extends through normally closed contacts 138 of the stepping relay 134 and normally open contacts 139 of the disabling relay 135 so that, when the latter is pulled in and the stepping relay has dropped out, the rotate coil will be energized to advance the pawl 119 and rotate the ratchet wheel 118 and the wipers through one step. The energizing circuit through the rectifier 136 for the release coil 122 includes normally closed contacts 140 of the disabling relay and a limit switch 141 which is held open by an actuator 142 on the ratchet wheel 118 when the latter is in its released position and which is closed in response to movement of the ratchet wheel away from the released position.

To condition the energizing circuit of the rotate coil 120 for control by the stepping relay 134 in timed relation to welding current changes and to reset the stepping switch 100 in its starting position at the end of each welding cycle, the disabling relay coil 135 is connected across the relay 1CR coil in the sequence timer 14 through conductors 143 and a switch 144. The latter is connected in tandem with the manually actuated transfer switch 133 and is closed when the transfer relay TR is energized. Thus, when the relay 1CR is energized in response to closure of the foot switch 10 to start the welding cycle, the disabling relay is pulled in to open the circuit to the release coil 122 and close the normally open contacts 139 to connect the rotate coil in series with the rectifier 136 and the normally closed stepping relay contacts 138. Then, when the welding cycle ends by firing of the hold tube 18, the relay 1CR and the disabling relay 135 are deenergized and the contacts 140 close to connect the release coil to the rectifier 136. It will be seen that, as soon as the disabling relay has pulled in, the rotate coil 120 is controlled by the stepping relay 134 alone.

To enable the amount of energy delivered to the welding electrodes to be maintained constant throughout each current "on" period, the stepping relay 134 preferably is actuated to energize the rotate coil 120 and advance the stepping switch ratchet wheel 118 at the end of each current "on" period and during a current "off" period. This is accomplished by connecting the rotate coil to the rectifier 136 through the normally closed stepping relay contacts 138 and by connecting the stepping relay 134 to the rectifier 136 through the normally open contacts 2TD-3 of the pulsation relay 2TD. Thus, when the pulsation tube 17 fires and the relay 2TD pulls in to complete the plate circuit for the start tube 55, the stepping relay pulls in to open the contacts 138 in the circuit of the rotate coil. Then, at the end of a current "on" period, the relay 2TD and the stepping relay drop out and the rotate coil 120 is energized. Contacts 2TD-3 are included in the energizing circuit of the stepping relay 134 by connecting the relay coil through normally open contacts TR-7 of the transfer relay TR to the terminals 58 to which, as described above, the contacts 2TD-3 are connected by conductors 57.

As described above, the relay 2TD also controls the plate circuits of the start and stop tubes 55 and 84 through the medium of contacts 2TD-3 which, when the transfer relay TR is deenergized, are connected in the start and stop tube plate circuits through conductors 60 and the normally closed transfer relay contacts TR-1. When the transfer relay TR is pulled in, however, such control is not direct. Instead, the conductors 60 of the start and stop tube plate circuits are connected through normally open contacts TR-8 of the transfer relay to normally open contacts 145 of the stepping relay 134 so that, when the contacts 2TD-3 close to energize the stepping relay, the contacts 145 of the latter close to complete the plate circuits of the start and stop tubes.

In the operation of the improved welding apparatus described above, let it be assumed that the parts are in their initial positions with the foot switch 10 open and the manual switches 133 and 144 closed so that the transfer relay TR is pulled in and the disabling relay 135 is connected across the relay 1CR. Upon closure of the foot switch to start the welding cycle, the disabling relay 135 is energized along with the relay 1CR and the contacts 139 are closed to connect the rotate coil 120 to the rectifier 136 through the normally closed stepping relay contacts 138. Thus, the rotate coil is energized and the stepping switch 100 is advanced one step to connect the first timing resistor 101 in series with the timing capacitor 90 and the first phase shift potentiometer 105 into the phase shift network 73. At this time, no welding current flows in the electrodes 11 because the plate circuit of the start tube 55 is open.

As soon as the relay 1TD is pulled in by firing of the squeeze tube 15 to terminate the squeeze interval and initiate the weld interval, the pulsation tube 17 fires to pull in the relay 2TD to initiate the first current "on" period. This results in opening of contacts 2TD-4 to open the discharge circuit of the timing capacitor 90 and closure of contacts 2TD-3 to complete the energizing circuit of the stepping relay 134. The latter pulls in to open the contacts 138 thereof for deenergization of the rotate coil 120 and retraction of the pawl 119 and to close the contacts 145 to complete the plate circuits of the start and stop tubes 55 and 84. Upon closure of these circuits, the start tube 55 fires to transmit impulses through the peaking and phase shift network 73 to the grids of the timing thyratrons 47 and the first current "on" period begins.

In this instance, the slider 128 of the first potentiometer 105 may be positioned somewhere adjacent the terminal thereof connected to the resistors 80 of the delta bridge circuit 78 and each impulse transmitted along the conductor 53 to the timing thyratron grids is delivered relatively late in the corresponding half cycle of the source 21. Thus, the firing thyratrons 39 and the ignitrons 38 fire late and the resultant welding current in the electrodes 11 is of a sufficiently low value to prevent spattering. Also, the setting of the first timing rheostat 101 may be a relatively low value to shorten the charging time of the timing capacitor 90 and therefore, the length of the first current "on" period.

As soon as the stop tube 84 fires, the relay 2CR pulls in to open the plate circuit of the pulsation tube 17 and deenergize the relay 2TD. This results in opening of contacts 2TD-3 and drop out of the stepping relay 134. The contacts 145 of the latter in the start tube plate circuit are thus opened to extinguish the start and stop tubes and the contacts 138 close for energization of the rotate coil 120 and advance of the pawl 119 to step the ratchet wheel around to its second position in which the second timing rheostat 102 and the second potentiometer 106 are connected into their respective circuits. Following a current "off" period whose length is determined by the setting of the resistor 36 in the bias circuit of the pulsation tube 17, the latter fires again to pull in the relay 2TD and repeat the sequence of a current "on" period followed by a current "off" period. In this instance, the settings of the variable elements of the timing rheostats and the phase shift potentiometers are such that the lengths of the successive current "on" periods and the amounts of current flowing therein increase progressively following a predetermined pattern from each period to the next throughout the weld interval.

Such alternate energization and deenergization of the relay 2TD and advance of the stepping switch 100 to render the timing rheostats and potentiometers effective successively continues until the weld tube 16 fires to pull in the relay 4TD and terminate the weld interval by opening the plate circuit of the pulsation tube. Firing of the weld tube also results in completion of the load circuit of the hold tube 18 through the contacts 4TD-2 and, in this instance, occurs after four current "on" periods. At the end of the hold interval, the hold tube 18 fires and the contacts 5TD-1 and 5TD-2 are opened to break the circuit for the relay 1CR and restore the tubes of the sequence timer including the hold tube to their initial extinguished conditions. The disabling relay 135 is deenergized also to open the circuit to the rotate coil 120 and complete the energizing circuit of the release coil 122 through the limit switch 141. Thus, the hold pawl 121 is retracted and the ratchet wheel 118 returns to its initial position under the action of the return spring. When the wheel reaches its initial position, the limit switch 141 is opened by the actuator 142 and the release coil 122 is deenergized so that the entire apparatus is conditioned to begin another welding cycle.

It will be apparent that the improved welding apparatus described above makes it possible to select at will not only a different value for the welding current flowing during each current "on" period but also a length for the latter different from the lengths of the other periods. Thus, the character of the weld which depends both on the amount and on the duration of welding current flow may be controlled very closely and the weld improved over that obtained with apparatus used heretofore. Such close control is achieved through the provision of a simple mechanism actuated in a novel manner in response to welding pulsation impulses inherent in the welding cycle and comprising relatively few parts which may be incorporated easily into prior welding apparatus.

We claim as our invention:

1. In welding control apparatus, the combination of, timing circuits controlling the flow of welding current to a load circuit and operable to cause said welding current to flow in a succession of current "on" periods and each comprising a succession of pulsations and each followed by a period of no current flow, a phase shift network in said timing circuits having a first variable impedance element controlling the amount of welding current flowing during each of said "on" periods, a second variable impedance element in said timing circuits controlling the length of each of said "on" periods, indexing means controlling said impedance elements and operable when actuated to change the values thereof, and means in said timing circuits controlling said indexing means and operable to actuate the latter in timed relation to said "on" periods to render effective during different "on" periods different values of each of said impedance elements thereby varying both the lengths of the "on" periods and the amount of current flow during the same.

2. In welding control apparatus, the combination of, a load circuit, control circuits operable when closed to cause welding current to flow to said load circuit and including a phase shift network controlling the amount of welding current flowing when the control circuits are closed, a relay operable to close and open said control circuits, means operable alternately to energize and deenergize said relay for the flow of welding current in said load circuit in a succession of pulsations, a plurality of separately adjustable impedance elements adapted to be connected individually into said phase shift network to vary the amount of welding current flowing in said load circuit when said control circuits are closed, and switching means responsive to energization and deenergization of said relay and operable intermittently to connect said impedance elements successively into said phase shift network.

3. An apparatus for use with a welding device in which welding current flows through a single load circuit in successive current "on" periods each comprising a succession of pulses and each followed by a current "off" period and which has a phase shift network for determining the amount of current flowing in each pulse, the combination of, a plurality of separate impedance elements whose values are separately variable, indexing mechanism adapted when actuated to advance step by step, a plurality of switches actuated by the advance of said indexing mechanism in successive steps to connect said impedance elements successively into said network, and means operable in timed relation to said current pulses and during said current "off" periods to activate said indexing mechanism and advance the latter one step during each current "off" period and at the ends of successive current "on" periods whereby to vary the amount of current flowing during successive "on" periods.

4. For use with a welding device having a phase shift network determining the amount of welding current flowing through a single load circuit during each welding cycle, the combination of, a plurality of separate selectively adjustable resistance elements adapted to be connected into said phase shift network to vary the amount of welding current, a stepping switch mechanism adapted when actuated intermittently to connect said resistance elements individually and successively into said phase shift network, and means operable periodically during the welding cycle to actuate said stepping mechanism and connect said resistance elements one by one into said phase shift network whereby to vary the amount of welding curent in accordance with selected values of the resistance elements.

5. For use with welding control apparatus having timing circuits controlling the flow of welding current to a load circuit in a succession of current "on" periods each followed by a current "off" period and a phase shift network controlling the amount of current flow in each current "on" period, the combination of, a plurality of selectively adjustable impedance elements adapted to be connected individually into said phase shift network to vary the amount of welding current flowing during said current "on" periods, selective switching means operable to connect said impedance elements successively into said phase shift network, and means for actuating said switching means in timed relation to said current "on" periods to connect a different impedance element into said phase shift network for each current "on" period.

6. In welding control apparatus, the combination of, a load circuit, a control circuit operable when closed to cause welding current to flow through said load circuit, a relay operable to close and open said control circuit respectively when the relay is energized and deenergized, means operable alternately to energize and deenergize said relay and including timing circuits operable in response to energization of the relay to deenergize the relay after a predetermined time interval, said timing circuits having a plurality of variable impedance elements adapted to control the length of said time interval, and selective switching means actuated in response to deenergization of said relay and each time the latter is deenergized and operable when actuated to connect a different one of said impedance elements into said timing circuits.

7. In welding control apparatus, the combination of, electron discharge means controlling the flow of welding current to a load circuit, timing circuits controlling said discharge means and operable to render the latter conductive for the flow of welding current in a series of current "on" periods each comprising a plurality of pulses and each followed by a current "off" period, said timing circuits including a variable impedance controlling the lengths of said current "on" periods, indexing means controlling said impedance and operable when actuated intermittently to vary the effective value of the impedance in a plurality of successive steps, and means operable to actuate said indexing means during successive current "off" periods to change the lengths of successive current "on" periods.

8. In apparatus for controlling the welding current flowing during a welding interval composed of a succession of current "on" periods each comprising a succession of pulses and each followed by a current "off" period, the combination of, a plurality of separate selectively adjustable resistance elements, a plurality of switches for connecting said resistance elements individually into timing circuits for controlling the lengths of said pulses, indexing mechanism adapted when actuated to advance step by step and actuate said switches to connect said resistance elements successively into said timing circuits, and means operable in timed relation to said current "on" periods to advance said indexing mechanism whereby to vary the lengths of successive pulses.

9. In welding control apparatus, the combination of, timing circuits controlling the flow of welding current to a load circuit in a succession of "on" periods each comprising in a series of pulsations, a plurality of separately adjustable impedance elements controlling the lengths of said periods and adapted to be connected individually into said timing circuits, a selector switch mechanism having a plurality of different positions and operable to connect the respective impedance elements successively into said timing circuits as the switch mechanism is indexed to its different positions, and means operable in timed relation to said periods to index said switch mechanism through said positions step by step to connect said impedance elements into said timing circuits successively and thereby render effective a different impedance element for each period.

10. In welding control apparatus, the combination of, timing circuits controlling the flow of welding current to a load circuit and operable to cause the current to flow in a succession of current "on" periods each followed by a current "off" period, a plurality of separate selectively adjustable impedance elements adapted to be connected into said timing circuits and to control the amount of electrical energy delivered to said load circuit during said current "on" periods, switching mechanism operable to connect said impedance elements individually and one at a time into said timing circuits, and indexing means operable in timed relation to said periods and once during each of said current "off" periods and at the ends of successive current "on" periods to actuate said switching mechanism and connect a different one of said impedance elements into said timing circuits for each of said current "on" periods.

11. In welding control apparatus, the combination of, control circuits operable when rendered effective to cause welding current to flow to a load circuit, a variable impedance in said control circuits controlling the flow of welding current, a relay operable alternately to disable and render effective said control circuit in response to energization and deenergization of the relay, means operable alternately to energize and deenergize said relay for the flow of welding current in a series of spaced current "on" periods each comprising a succession of pulsations, a stepping switch mechanism operable to render different values of said impedance effective in said control circuits as the mechanism is advanced through successive positions, and indexing means responsive to energization and deenergization of said relay and operable at the end of each of successive ones of said periods to advance said switch mechanism before the next period whereby to render different values of said impedance effective successively in said control circuits.

12. In welding control apparatus, the combination of, a load circuit, timing circuits controlling the flow of welding current through said load circuit and operable to cause the welding current to flow in a succession of "on" periods separated by periods of no current flow, a plurality of selectively adjustable impedance elements adapted to be connected into said timing circuits and each adapted when so connected to control the amount of electrical energy delivered to said load circuit during said "on" periods, switching mechanism adapted to be advanced step by step to connect said impedance elements successively and one at a time into said timing circuits, and indexing means operable intermittently in timed relation to said periods to advance said switching mechanism one step and connect a different one of said impedance elements into said timing circuits for each "on" period.

13. For use with welding control apparatus having timing circuits controlling the flow of welding current to a single load circuit in a series of stages each having a current "on" period followed by a current "off" period, the combination of, a plurality of selectively adjustable impedance elements each adapted when connected into said timing circuits to control the amount of electrical energy delivered to the load circuit during said current "on" periods, switching mechanism adapted to advance step by step and connect said impedance elements successively and one at a time into said timing circuits, and means operable to actuate said switching means and advance the latter one step during each of said stages to connect a different impedance element into said timing circuits for each of said current "on" periods.

References Cited in the file of this patent

UNITED STATES PATENTS

| | | |
|---|---|---|
| 2,401,780 | Undy | June 11, 1946 |
| 2,556,715 | Vigars | June 12, 1951 |
| 2,677,037 | Platte | Apr. 27, 1954 |